(12) United States Patent
Park

(10) Patent No.: US 6,256,325 B1
(45) Date of Patent: Jul. 3, 2001

(54) TRANSMISSION APPARATUS FOR HALF DUPLEX COMMUNICATION USING HDLC

(75) Inventor: Chan-Sik Park, Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/089,763

(22) Filed: Jun. 3, 1998

(30) Foreign Application Priority Data

Jun. 4, 1997 (KR) .................................. 97/23166

(51) Int. Cl.[7] ........................................ H04J 3/06
(52) U.S. Cl. ............................. 370/503; 340/928
(58) Field of Search .................... 370/503, 509, 370/511, 513, 514; 340/928, 933, 942; 235/375, 380, 381, 384

(56) References Cited

U.S. PATENT DOCUMENTS

| | | | |
|---|---|---|---|
| 4,519,081 | * | 5/1985 | Sugie .................................. 714/811 |
| 5,237,569 | * | 8/1993 | Sekihata et al. .................... 370/394 |
| 5,448,242 | * | 9/1995 | Sharpe et al. ........................ 342/42 |
| 5,805,082 | * | 9/1998 | Hassett ............................... 340/928 |

\* cited by examiner

Primary Examiner—Melvin Marcelo
Assistant Examiner—Jasper Kwoh

(74) Attorney, Agent, or Firm—Robert E. Bushnell, Esq.

(57) ABSTRACT

A transmission apparatus for half duplex communication using HDLC is provided, in which a simple logic circuit is added to a general HDLC controller to transmit a frame, adding flags before and after the frame all the time, without modification of program even when a transmission speed is changed, thereby enabling rapid and reliable communications. The transmission apparatus for half duplex communication using HDLC includes: a clock (TxC) generator, to supply it to each section of the apparatus as a synchronous clock; an HDLC controller for outputting a flag signal in a predetermined bit pattern while it does not transmit a frame signal; flag delay/detecter for outputting with delaying an output (TxD) of the HDLC controller by one byte, and outputting a flag detection signal (/Flag_detect) whenever the flag signal is detected; a CPU for outputting a transmission request signal (/Tx_Req) during a period determined with relation to the magnitude of the frame signal when data transmission is required, and sending the frame signal to the HDLC controller after a transmission ready signal (/Tx_Ready) is received; control logic for synchronizing the transmission request signal (/Tx_Req) with the flag detection signal (/Flag_detect) subsequently generated, to generate the transmission ready signal (/Tx_Ready), and to output a transmission enable signal (/Tx_Enable) determining a transmission enable time, thereby adding a desired number of flag signals (Flag) before and after the frame signal; and an output controller for sequentially encoding signals output from the HDLC controller in a predetermined code system, and outputting the encoded signals during an active time of the transmission enable signal (/Tx_Enable).

14 Claims, 7 Drawing Sheets

TRANSMISSION APPARATUS FOR HALF DUPLEX COMMUNICATION USING HDLC

CLAIM OF PRIORITY

This application makes reference to, incorporates the same herein, and claims all benefits accruing under 35 U.S.C §119 from an application entitled Transmission Apparatus For Half Duplex Communication Using HDLC earlier filed in the Korean Industrial Property Office on Jun. 4, 1997, and there duly assigned Ser. No. 97-23166 by that Office.

FIELD OF THE INVENTION

The present invention relates to a transmission apparatus for half duplex communication using high level data link control (HDLC), specifically, to a transmission apparatus for half duplex communication using HDLC, which enables reliable communications between a lane-installed radio frequency communication controller (RFC) and a vehicle-attached controller using back scattering method in an electronic toll collecting system (ETCS) which is an important part of an intelligent transmission system.

BACKGROUND OF THE INVENTION

Dedicated short range communication (DSRC) using 5.8 GHz of frequency is being widely used in an electronic toll collecting system, and especially adopted as a standard in European countries. An exemplary electronic toll collecting system is constructed in such a manner that a radio frequency communication controller is installed in a tollgate for each lane of a toll road. An on-board unit for communicating with the radio frequency communication controller is attached to a vehicle. This system employs a back scattering communication technique so as to simplify the configuration of the on-board unit. Accordingly, communications are performed in a half duplex communication mode, and an HDLC protocol is used as a data link layer to carry out reliable communication between the on-board unit passing a narrow communication area and radio frequency communication controller.

The transmission unit in a HDLC protocol is called a "frame" which includes an address field, control field and information field. The address field is used to indicate the address of a transmitting part or a receiving part, and the control field is used for various monitoring and controlling operations. The information field is a portion where actual information messages enter, and its length may be optional. Before and after the frame, flags are inserted in order to display the initiation and the completion of a frame and maintain the settlement of synchronization. The flag is fixed in an 8-bit specific pattern, for example, $01111110_2$ (7EH). The radio frequency communication controller, or on-board unit, can recognize the initiation or the completion of the frame, on finding the flag bit pattern, since only the flag portion in the transmitted data is fixed.

In the above system, the radio frequency communication controller plays a main role in communications in such a way that, if the on-board unit responds to a response request signal sent from the radio frequency communication controller, a transaction is finished according to a predetermined communication sequence, and if not, the radio frequency communication controller transmits the response request signal in a specific cycle. Since the system uses the back scattering method, only a carrier wave is allowed to be transmitted to the on-board unit during a period when the radio frequency communication controller does not transmit data. Here, efficient high-speed communication can be realized only when the amount of data transmitted/received between the radio frequency communication controller and the on-board unit is minimized to reduce the time required for the communication. Furthermore, in order to allow the reception part to stably recover data, it is required that the data be coded using a code system having clock information, such as Manchester code or frequency modulation 0 (FM0) code, and it is transmitted in the form of flag-flag-frame-flag-flag, where at least two flags are guaranteed.

One method for satisfying the aforementioned minimum condition is a method in which a central processing unit (CPU) included in the radio frequency communication controller drives an HDLC controller at a predetermined time before the actual frame will be transmitted, to transmit a flag, and then the frame is transmitted after the lapse of time calculatively obtained. In this technique, a flag following the frame is also transmitted by the same manner. There is another method in which data are made in the form of flag-flag-frame-flag-flag according to a software program, and then transmitted through the HDLC controller, without forming the flag by using the HDLC controller.

The former method has a problem in exact transmission of two flags because of nonsynchronization between a time required for the CPU to wait and a flag transmitting time. Furthermore, if the transmission speed is changed, normal communication needs to modify the program.

Moreover, when a general HDLC controller is employed, the impedance of its output port should be continuously switched according to whether data is transmitted or not, because the radio frequency communication controller is required not to transmit other data after the transmission of predetermined data, which impedes the rapid communications.

Meanwhile, though the latter technique where the flags are inserted into the frame is conceptionally easy to perform, the reception part cannot recognize the flags because the general HDLC controller has a zero insertion function which compulsorily inserts '0' when five '1's or more occur continuously. Accordingly, there is a problem wherein normal communications are not able to be carried out.

SUMMARY OF THE INVENTION

Therefore, in order to overcome the above mentioned drawbacks, an objective of the present invention is to provide a transmission apparatus for half duplex communication using HDLC, in which a simple logic circuit is added to a HDLC controller to transmit a frame, adding flags before and after the frame all the time, without modification of a program even when a transmission speed is changed, thereby enabling rapid and reliable communications.

To accomplish the objective of the present invention, there is provided a transmission apparatus for half duplex communication using HDLC, including: means for generating a clock (TxC), to supply the clock to each section of the apparatus as a synchronous clock; an HDLC controller for continuously outputting a flag signal in a predetermined bit pattern while it does not transmit a frame signal; flag delay/detection means for outputting with delaying an output (TxD) of the HDLC controller by one byte, and outputting a flag detection signal (/Flag_detect) whenever the flag signal is detected; a CPU for outputting a transmission request signal (/Tx_Req) during a period determined with relation to the magnitude of the frame signal when data transmission is required, and sending the frame signal to the HDLC controller after a transmission ready signal (/Tx_

Ready) is received; control logic means for synchronizing the transmission request signal (/Tx_Req) with the flag detection signal (/Flag_detect) subsequently generated, to generate the transmission ready signal (/Tx_Ready), and simultaneously, to output a transmission enable signal (/Tx_Enable) determining a transmission enable time, thereby adding a desired number of flag signals (Flag) before and after the frame signal; and output control means for sequentially encoding signals output from the HDLC controller in a predetermined code system, and outputting the encoded signals during an active time of the transmission enable signal (/Tx_Enable).

In the above configuration, the flag delay/detection means include an 8-bit shift register for shifting the output (Tx/D) of the HDLC controller, and an 8-bit comparator for judging whether the contents of the shift register correspond to the flag signal or not, and then generating the flag detection signal (/Flag_detect) when the contents of the shift register correspond to the flag signal.

The control logic menas include a first D-flip-flop for synchronizing the transmission request signal (/Tx_Req) with the flag detection signal (/Flag_detect), to output the transmission ready signal (/Tx_Ready), a second D-flip-flop for outputting with delaying the transmission ready signal (/Tx_Ready) by a time required for inputting one flag, and an AND-gate for AND-gating the outputs of the two D-flip-flops, to generate the transmission enable signal (/Tx_Enable).

BRIEF DESCRIPTION OF ATTACHED DRAWINGS

These and other features of the invention will be understood more clearly from the following description, read in conjunction with the drawings, in which FIG. 1 is a diagram for explaining the operation principle of an exemplary electronic toll collecting system;

DETAILED DESCRIPTION OF PREFERRED EMBODIMENT

Figure 1:
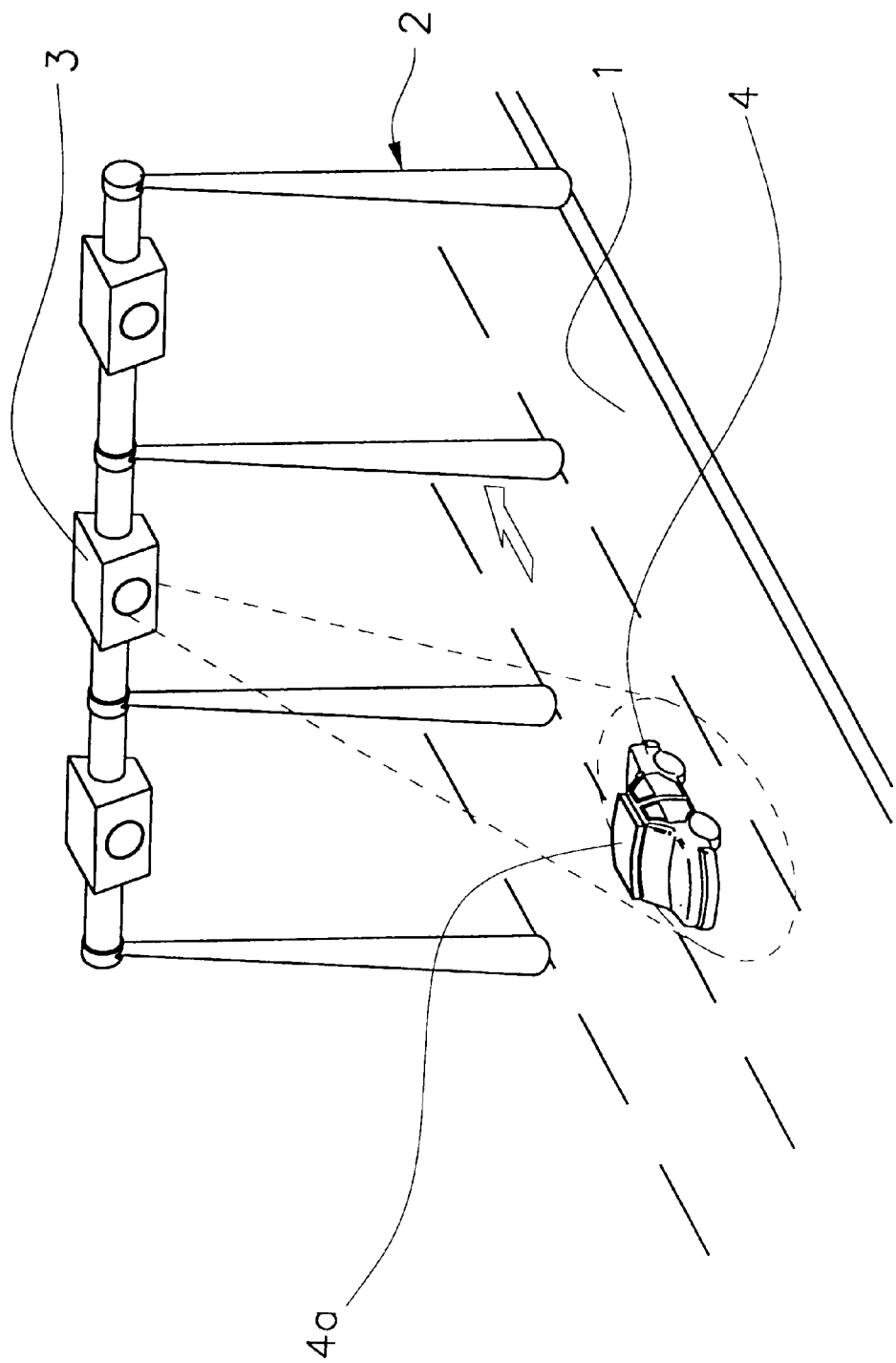

FIG. 1 is a diagram for explaining the operation principle of an exemplary electronic toll collecting system. As shown in FIG. 1, the electronic toll collecting system is constructed in such a manner that a radio frequency communication controller 3 is installed for each lane 1 of a tollgate 2, and an on-board unit (OBU) 4a for communicating with radio frequency communication controller 3 is attached to a vehicle 4. This system employs a back scattering communication technique so as to simplify the configuration of on-board unit 4a. Accordingly, communications are performed in a half duplex communication mode, and an HDLC protocol is used as a data link layer to carry out reliable communication between on-board unit 4a passing a narrow communication area and radio frequency communication controller 3.

The transmission unit in a HDLC protocol is called a "frame" which includes an address field, control field and information field. The address field is used to indicate the address of a transmitting part or a receiving part, and the control field is used for various monitoring and controlling operations. The information field is a portion where actual information messages enter, and its length may be optional. Before and after the frame, flags are inserted in order to display the initiation and the completion of a frame and maintain the settlement of synchronization. The flag is fixed in an 8-bit specific pattern, for example, $01111110_2$ (7EH). Radio frequency communication controller 3 or on-board unit 4a can recognize the initiation or the completion of the frame, on finding the flag bit pattern, since only the flag portion in the transmitted data is fixed.

In the above system, radio frequency communication controller 3 plays a main role in communications in such a way that, if on-board unit 4a responds to a response request signal R sent from radio frequency communication controller 3, a transaction is finished according to a predetermined communication sequence, and if not, radio frequency communication controller 3 transmits the response request signal R in a specific cycle. Since the system uses the back scattering method, only a carrier wave is allowed to be transmitted to on-board unit 4a during a period when radio frequency communication controller 3 does not transmit data. Here, efficient high-speed communication can be realized only when the amount of data transmitted/received between radio frequency communication controller 3 and on-board unit 4a is minimized to reduce a time required for the communication. Furthermore, in order to allow the reception part to stably recover data, it is required that the data be coded using a code system having clock information, such as Manchester code or frequency modulation 0 (FM0) code, and it is transmitted in the form of flag-flag-frame-flag-flag, where at least two flags are guaranteed.

Figure 2:
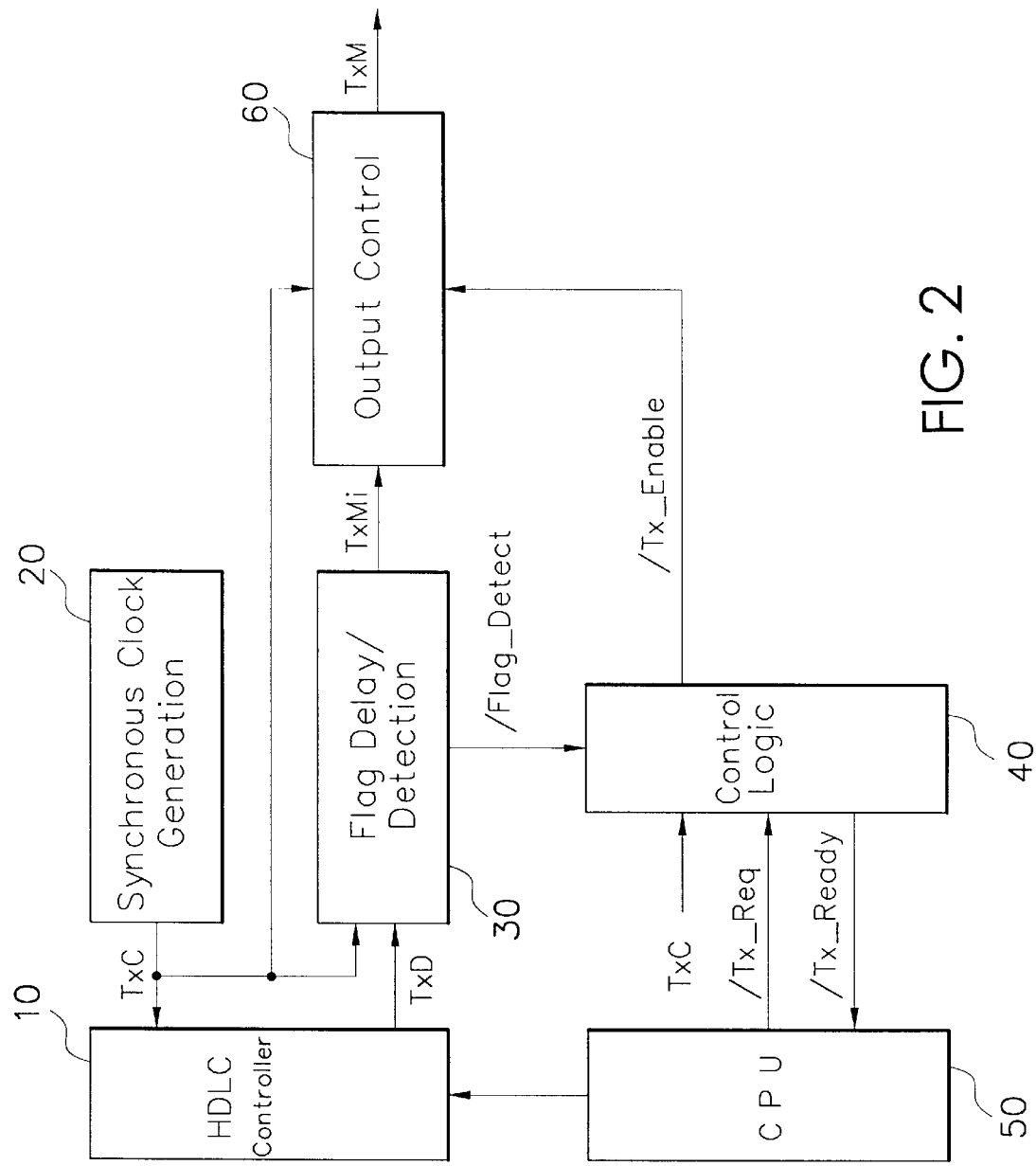
FIG. 2 is a block diagram of a transmission apparatus for half duplex communication using HDLC according to a preferred embodiment of the present invention.

Referring to FIG. 2, a transmitting apparatus for half duplex communication according to the present invention comprises a CPU 50 for generally controlling the apparatus, a synchronous clock generator 20 for generating a clock signal (TxC) and supplying it to each section of the apparatus as a synchronous signal, an HDLC controller 10 for outputting a frame signal supplied from CPU 50 under the control of CPU 50, and outputting a flag signal in a predetermined bit pattern while it does not output the frame signal, a flag delay/detection section 30 for delaying an output signal (TxD) of HDLC controller 10 by the number of bits of the flag signal, that is, one byte, and outputting a flag detection signal (/Flag_detect) whenever the flag signal is detected, a control logic 40 for sending to CPU 50 a transmission ready signal (/Tx_Ready) obtained by synchronizing the transmission request signal (/Tx_Req) with the flag detection signal (/Flag_detect), and generating a transmission enable signal (/Tx_Enable), when a transmission request signal (/Tx_Req) is received from CPU 50, and an output control section 60 for synchronizing a 'transmission signal before coding (TxMi)' with clock signal (TxC) to encode it in a predetermined code system and outputting the encoded signal (TxM) as a final transmission signal during an active time of transmission enable signal (/Tx_Enable) output from control logic 40.

In this configuration, HDLC controller 10 may be a general HDLC controller, and CPU 50 may be configured from a microprocessor. Clock signal (TxC) generated by synchronous clock generator 20 may be any square wave with a frequency which can be used by general HDLC controller 10. CPU 50 can previously record the frame signal in a register inside HDLC controller 10 to allow HDLC controller 10 to transmit it. Thus, CPU 50 is able to initiate the transmission only by sending a transmission initiation command.

Figure 3:
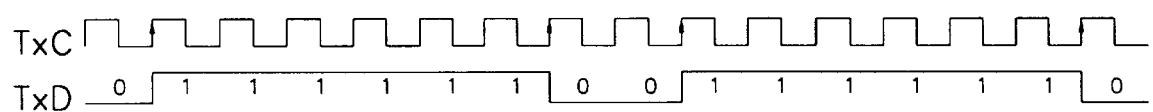
FIG. 3 is a timing diagram showing the relation between synchronous clock signal (TxC) and HDLC output signal (TxD) in the bit unit.
Figure 4:
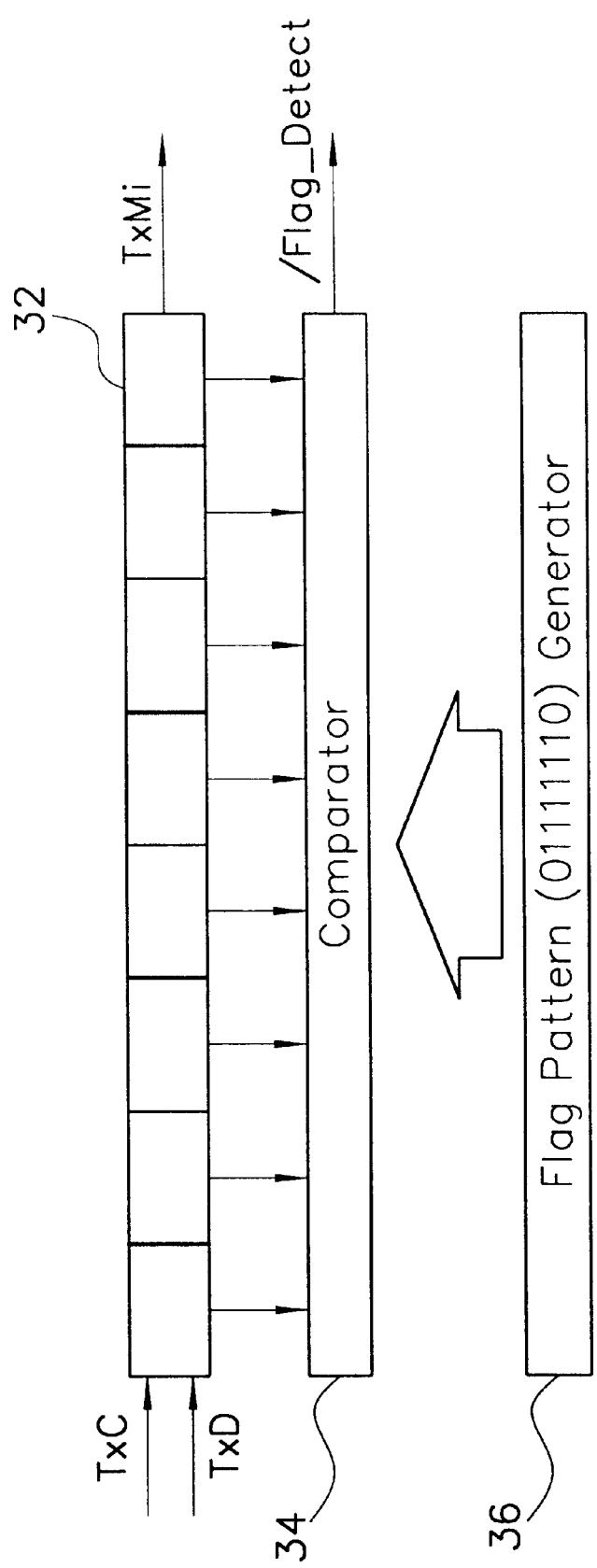
FIG. 4 is a diagram showing a configuration of flag delay/detection section of FIG. 2.

Referring to FIG. 3, HDLC controller 10 stores a flag pattern signal, and then transmits it by one bit at every rising edge of synchronous clock signal (TxC). Furthermore, HDLC controller 10 continuously generates the flag signal as output signal (TxD) until it is time to transmit actual data, i.e., a frame signal, as output signal (TxD), in order to reduce a time required for switching of its impedance state, and also generates the flag signal even in a vacant period between the flag signal and frame signal. Flag delay/detection section 30, as shown in FIG. 4, includes an 8-bit shift register 32 for shifting input signal (TxD) and outputting it, and an 8-bit comparator 34 for comparing the contents of shift register 32 with a specific flag pattern provided by flag pattern generator 36, for example, $01111110_2$, to determine whether the contents of shift register 32 correspond to the flag signal or not, and outputting flag detection signal (/Flag_detect) when it is determined that the contents of shift register 32 correspond to the flag signal. Accordingly, signal (TxD) is delayed by one byte while it passes through shift register 32.

Figure 5:
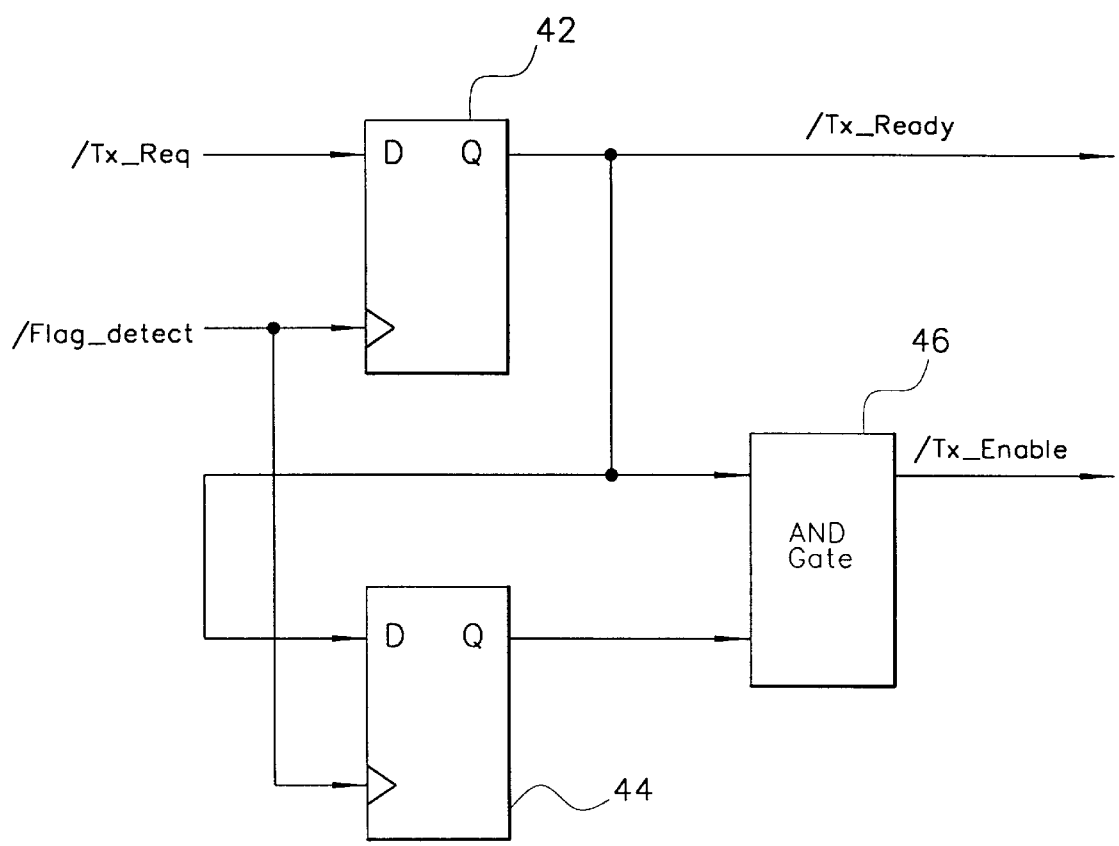
FIG. 5 is a diagram showing a configuration of control logic section of FIG. 2.

Referring to FIG. 5, control logic 40 includes two D-flip-flops 42 and 44 and an AND-gate 46 for AND-gating the outputs of the D-flip-flops 42 and 44. D-flip-flop 42 delays transmission request signal (/Tx_Req) supplied from CPU 50, to synchronize it with flag detection signal (/Flag_detect) output from flag delay/detection section 30, outputting transmission ready signal (/Tx_Ready) synchronized with the flag signal. The other D-flip-flop 44 delays transmission ready signal (/Tx_Ready) output from D-flip-flop 42 by a time required for the generation of one flag, and outputs it. AND-gate 46 AND-gates transmission ready signal (/Tx_Ready) output from D-flip-flop 42 and a delayed transmission ready signal output from D-flip-flop 44, to generate transmission enable signal (/Tx_Enable) for enabling the transmission of coded signal (TxM).

Figure 6:
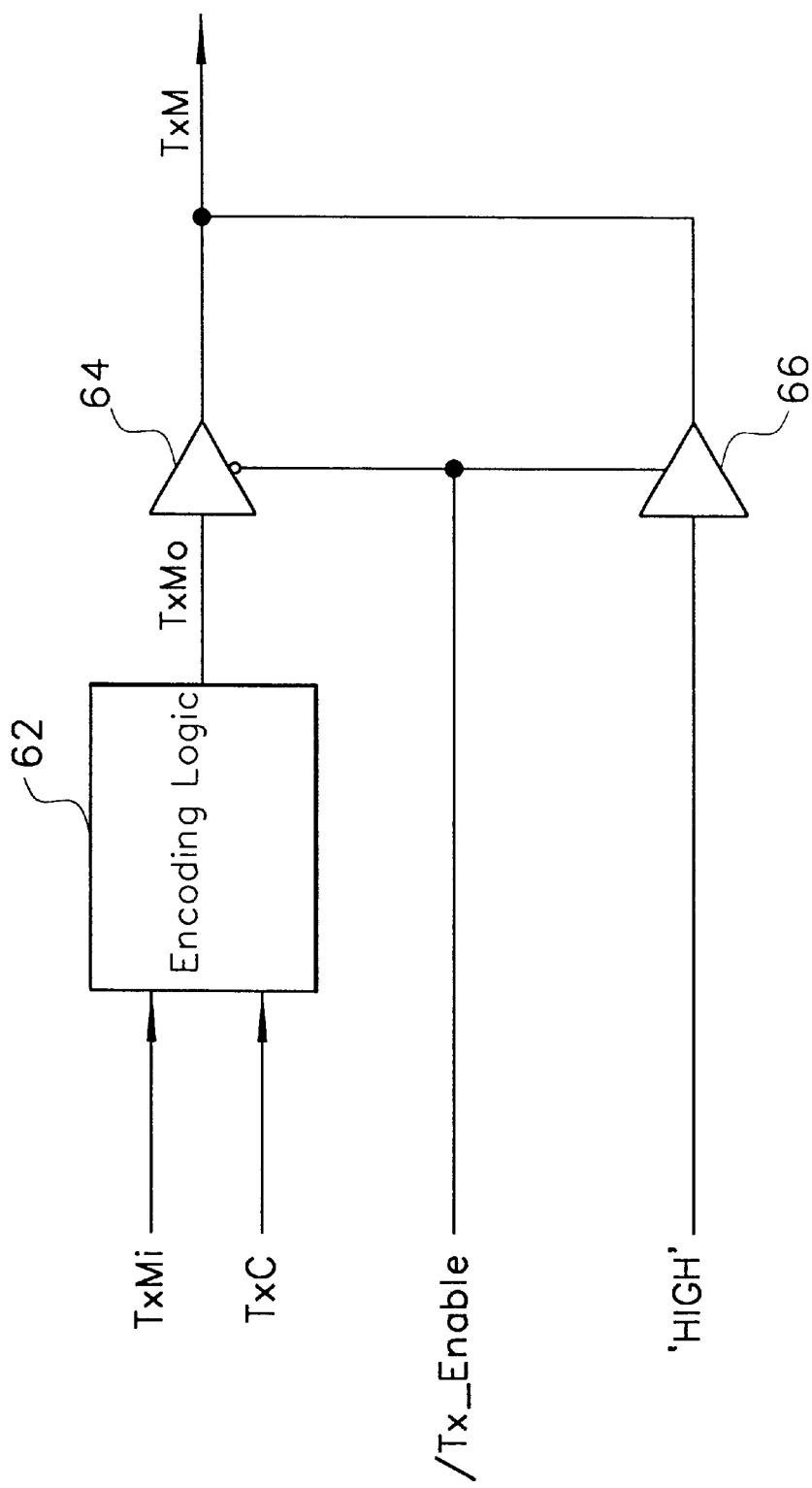
FIG. 6 is a diagram showing a configuration of output control section of FIG. 2.

Output controller 60, as shown in FIG. 6, includes an encoding logic 62 for coding a transmission signal (TxMi) in a desired code system, preferably, Manchester code or FMO code system, a negative-logic 3-state buffer 64 for passing a transmission signal (TxMo) encoded by encoding logic 62 only while transmission enable signal (/Tx_Enable) is in a low level, and a positive-logic 3-state buffer 66 for passing a high-level signal (HIGH) only while transmission enable signal (/Tx_Enable) is in a high level. As a result, encoded, or final transmission signal (TxM) is modulated by a modulator (not shown), to be transmitted to an on-board unit attached to a vehicle. When the final transmission signal (TxM) is not provided, the modulator is controlled by the high-level signal which has been passed through positive-logic 3-state buffer 66, to output only a carrier wave.

Figure 7:
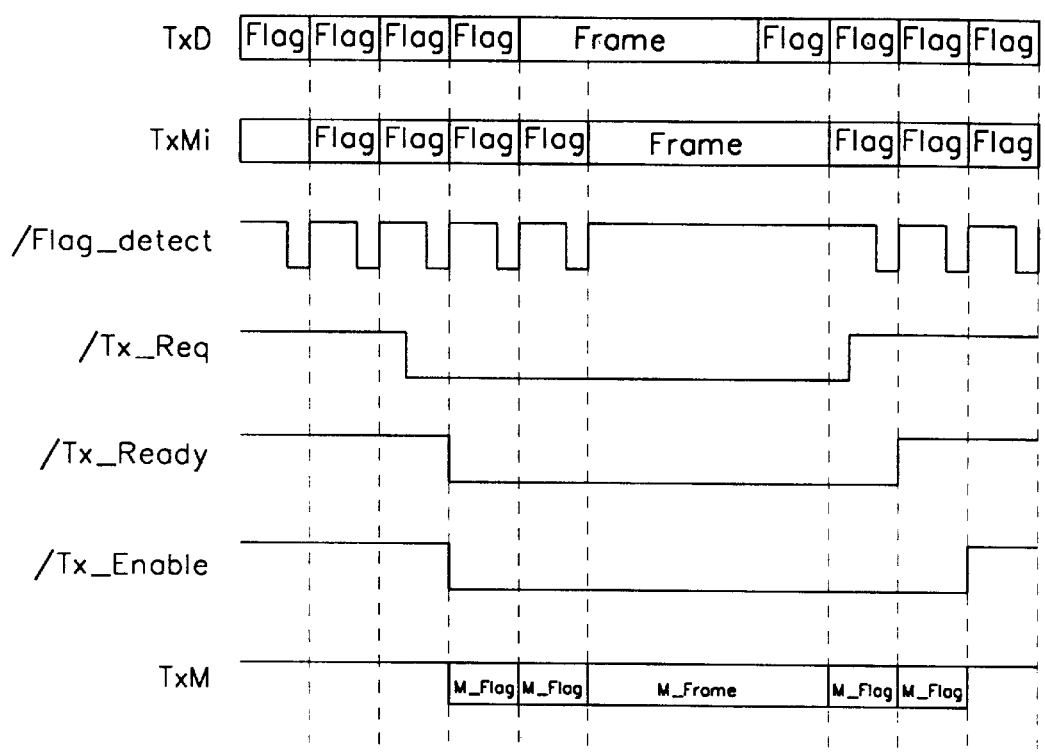
FIG. 7 is a timing chart each of which shows the output signal of each section of FIG. 2.

The operation of the transmission apparatus for half duplex communication using HDLC of the invention is explained below. FIG. 7 are timing diagrams each of which show the output of each section of FIG. 2, where reference symbol '/' indicates active low operation. First of all, when CPU 50 does not request a transmission, HDLC output signal (TxD) is the flag signal. This HDLC output signal (TxD) is supplied to flag delay/detection section 30 and accumulated by one byte as delayed output signal (TxD), to be output as 'transmission signal before coding (TxMi)'.

During this procedure, comparator 34 of flag delay/detection section 30 compares delayed output signal (TxD) with a flag pattern provided by flag pattern generator 36, and converts the state of flag detection signal (/Flag_detect) from a high level into a low level during a predetermined time when the compared result corresponds to the flag signal. When CPU 50 requests the transmission, the state of transmission request signal (/Tx_Req) is converted from a high level into a low level. Here, control logic 40 synchronizes transmission request signal (/Tx_Req) with flag detection signal (/Flag_detect), to delay it, outputting transmission ready signal (/Tx_Ready) which is synchronized with the flag signal so that its state is converted into a low level. Simultaneously, the state of transmission enable signal (/Tx_Enable) is also converted into a low level. When transmission enable signal (/Tx_Enable) becomes a low level, output controller 60 encodes 'transmission signal before coding (TxMi)', to output it as final transmission signal (TxM). This initiates the transmission of the first coded flag signal (M_Flag).

Meantime, CPU 50 acknowledges transmission ready signal (/Tx_Ready), and then sends the frame signal to HDLC controller 10. Since there is a time gap between the outputting of the first flag signal and the inputting of the frame signal, HDLC controller 10 outputs the frame signal after the second flag signal is output. The second flag signal is also coded according to the aforementioned procedure, to be output in the form of coded flag signal (M_Flag). Thereafter, the frame signal is is output from HDLC controller as output signal (TxD) and the frame signal is also coded, to be output in the form of 'coded frame signal (M_Frame)'.

By doing so, the frame signal is transmitted, and then HDLC controller 10 starts to output the flag signal again. Flag delay/detection section 30 accumulates the first flag signal by one byte, and then starts to output the first flag signal, and simultaneously outputs flag detection signal (/Flag_detect). Meantime, after a lapse of time (this time is determined with relation to the magnitude of the frame signal), starting from a point where CPU 50 outputs the frame signal, CPU 50 stops the transmission request. In other words, the transmission request signal (/Tx_Reg) is returned to a high level a predetermined period (e.g., a flag period) after the completing the output of the frame signal. In this case, control logic 40 synchronizes transmission request signal (/Tx_Req) with flag detection signal (/Flag-detect), to delay it. Thus, transmission ready signal (/Tx_Ready) is also synchronized with the flag signal, to be converted into a high-level signal. As a result, the flag signal, which appears first after the frame signal, is coded, to be output in the form of 'coded flag signal (M_Flag)'.

Control logic 40 converts transmission enable signal (/Tx_Enable) into a high-level signal after D-flip-flop 44 and AND-gate 46 output the transmission ready signal (/Tx_Ready) as a high-level signal. When transmission enable signal (/Tx_Enable) becomes a high level, negative-logic 3-state buffer 64 of output controller 60 is disabled, but positive-logic 3-state buffer 66 is enabled, outputting high-level signal (HIGH). Accordingly, only a carrier wave is automatically output after the transmission of data in the form of flag-flag-frame-flag-flag. Through the aforementioned operation, CPU 50 can transmit data in a desired form without regard to transmission timing or the number of flags to be transmitted.

It will be apparent to those skilled in the art that various modifications and variations can be made in the transmission apparatus for half duplex communication using HDLC of the present invention without departing from the spirit or scope of the invention. Thus, it is intended that the present invention cover the modifications and variations of this invention provided they come within the scope of the appended claims and their equivalents.

What is claimed is:

1. A transmission apparatus for half duplex communication using high level data link control (HDLC), comprising:

means for generating a clock signal, to supply the clock signal to each section of the apparatus as a synchronous clock signal;

an HDLC controller for outputting an output signal via an output terminal, said output signal comprising a flag signal and a frame signal, said flag signal being repeatedly output except when said frame signal is output;

flag delay/detection means for delaying said output signal of said HDLC controller by one byte, and outputting a flag detection signal whenever said flag signal is detected;

a central processing unit for outputting a transmission request signal when data transmission is required, and for sending said frame signal to said HDLC controller after a transmission ready signal is received;

control logic means for synchronizing said transmission request signal with said flag detection signal to generate said transmission ready signal, and for generating a delayed transmission ready signal and outputting a transmission enable signal determining a transmission enable time, in response to said transmission ready signal and said delayed transmission ready signal, to enable a desired number of flag signals to be transmitted before and after said frame signal; and output control means for sequentially encoding signals output from said HDLC controller via said flag delay/detection means according to a predetermined code system, and outputting the encoded signals during an active time of said transmission enable signal.

2. The transmission apparatus as claimed in claim 1, wherein said flag delay/detection means comprise:

an 8-bit shift register responsive to said clock signal for receiving the output signal from said HDLC controller and outputting a delayed output signal; and an 8-bit comparator for comparing the contents of said 8-bit shift register to a predetermined flag pattern, said 8-bit comparator generating said flag detection signal when said contents of said 8-bit shift register correspond to said flag pattern.

3. The transmission apparatus as claimed in claim 1, wherein said control logic means comprise:

a first D type flip-flop having a data input connected to said central processing unit for receiving said transmission request signal, a clock input for receiving said flag detection signal, and an output for outputting said transmission ready signal;

a second D type flip-flop having a data input for receiving said transmission ready signal output from said first D type flip-flop, a clock input for receiving said flag detection signal and an output for outputting said delayed transmission ready signal by a time period corresponding to one flag period; and an AND-gate for receiving said transmission ready signal and said delayed transmission ready signal to generate said transmission enable signal.

4. The transmission apparatus as claimed in claim 2, wherein said control logic means comprise:

a first D type flip-flop having a data input connected to said central processing unit for receiving said transmission request signal, a clock input for receiving said flag detection signal s output by said 8-bit comparator, and an output for outputting said transmission ready signal;

a second D type flip-flop having a data input for receiving said transmission ready signal output from said first D type flip-flop, a clock input for receiving said flag detection signal output by said 8-bit comparator, and an output for outputting said delayed transmission ready signal by a time period corresponding to one flag period; and an AND-gate for receiving said transmission ready signal and said delayed transmission ready signal to generate said transmission enable signal.

5. The transmission apparatus as claimed in claim 1, wherein said output control means outputs only a carrier signal when there is no frame signal to be transmitted.

6. The transmission apparatus as claimed in claim 1, wherein said output control means comprise:

an encoding logic for coding said signals output from said HDLC controller via said flag delay/detection means in a Manchester code or FM0 code;

a negative-logic tri-state buffer for passing a transmission signal encoded by encoding logic only while said transmission enable signal is at a low logic level; and a positive-logic tri-state buffer for passing a high-level logic signal while said transmission enable signal is at a high logic level.

7. The transmission apparatus as claimed in claim 2, wherein said output control means comprise:

an encoding logic for coding said signals output from said HDLC controller via said flag delay/detection means in a Manchester code or FM0 code;

a negative-logic tri-state buffer for passing a transmission signal encoded by encoding logic only while said transmission enable signal is at a low logic level; and a positive-logic tri-state buffer for passing a high-level logic signal while said transmission enable signal is at a high logic level.

8. The transmission apparatus as claimed in claim 4, wherein said output control means comprise:

an encoding logic for coding said signals output from said HDLC controller via said flag delay/detection means in a Manchester code or FM0 code;

a negative-logic tri-state buffer for passing a transmission signal encoded by encoding logic only while said transmission enable signal is at a low logic level; and a positive-logic tri-state buffer for passing a high-level logic signal while said transmission enable signal is at a high logic level.

9. The transmission apparatus as claimed in claim 5, wherein said output control means comprise:

an encoding logic for coding said signals output from said HDLC controller via said flag delay/detection means in a Manchester code or FM0 code;

a negative-logic tri-state buffer for passing a transmission signal encoded by encoding logic only while said transmission enable signal is at a low logic level; and a positive-logic tri-state buffer for passing a high-level logic signal while said transmission enable signal is at a high logic level, said output control means outputting said carrier signal in response to said high-level logic signal.

10. A method of data transmission for half duplex communication using high level data link control (HDLC), comprising:

repeatedly generating a flag signal from an HDLC controller;

delaying said flag signal by one flag period;

comparing said delayed flag signal to a predetermined flag pattern and generating a flag detection signal when said delayed flag signal correspond to said flag pattern;

generating a transmission request signal when data transmission is required;

generating a transmission ready signal by synchronizing said transmission request signal with said flag detection signal;

outputting a frame signal in response to said transmission ready signal;

generating a delayed transmission ready signal by delaying said transmission ready signal;

logically combining said transmission ready signal and said delayed transmission ready signal to generate a transmission enable signal having a predetermined period for enabling a desired number of said flag signals to be added before and after said frame signal; and encoding said frame signal and said flag signals added before and after said frame signal, according to a predetermined code system, for transmission.

11. The method as set forth in claim 10, wherein said step of encoding comprises encoding according to a Manchester code.

12. The method as set forth in claim 10, wherein said step of encoding comprises encoding according to a FM0 code.

13. The method as set forth in claim 10, wherein said step of generating a transmission request signal comprises generating said until a predetermined time after completing the outputting of said frame signal.

14. The method as set forth in claim 13, wherein said predetermined time corresponds to one flag period.

* * * * *